US011394519B2

(12) United States Patent
Su et al.

(10) Patent No.: US 11,394,519 B2
(45) Date of Patent: Jul. 19, 2022

(54) COMMUNICATION METHOD AND APPARATUS

(71) Applicant: HUAWEI TECHNOLOGIES CO., LTD., Guangdong (CN)

(72) Inventors: Liyan Su, Beijing (CN); Lei Guan, Beijing (CN); Sha Ma, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 112 days.

(21) Appl. No.: 16/828,169

(22) Filed: Mar. 24, 2020

(65) Prior Publication Data
US 2020/0228296 A1 Jul. 16, 2020

Related U.S. Application Data

(63) Continuation of application No. PCT/CN2017/103177, filed on Sep. 25, 2017.

(51) Int. Cl.
*H04L 5/00* (2006.01)
*H04W 28/04* (2009.01)
*H04W 72/12* (2009.01)

(52) U.S. Cl.
CPC ............ *H04L 5/0057* (2013.01); *H04L 5/001* (2013.01); *H04W 28/04* (2013.01); *H04W 72/1273* (2013.01); *H04W 72/1289* (2013.01)

(58) Field of Classification Search
CPC ..... H04L 5/0057; H04L 5/001; H04L 5/0055; H04L 1/1845; H04L 1/1896;
(Continued)

(56) References Cited

U.S. PATENT DOCUMENTS 9,553,706 B2 * 1/2017 Luo .................. H04L 5/0051
10,187,832 B2 * 1/2019 Loehr ................ H04L 1/1887
(Continued)

FOREIGN PATENT DOCUMENTS

CN 104040930 A 9/2014
CN 106961318 A 7/2017
(Continued)

OTHER PUBLICATIONS

Interdigital Communications: "Redundancy below PDCP for NR", 3GPP Draft; R2-1701183, vol. Ran WG2, No. Athens, Greece; Feb. 13, 2017 Feb. 17, 2017, Feb. 12, 2017, 4 pages.
(Continued)

*Primary Examiner* — Hardikkumar D Patel
(74) *Attorney, Agent, or Firm* — Womble Bond Dickinson (US) LLP

(57) ABSTRACT

In the method, a terminal device receives first downlink control information from a network device, where the first downlink control information includes a first hybrid automatic repeat request (HARQ) process number. The terminal device receives, on a first frequency band, a first data packet carrying a first transport block, and receives, on a second frequency band, a second data packet carrying a second transport block, where the first HARQ process number corresponds to the first transport block on the first frequency band and the second transport block on the second frequency band. The terminal device performs joint decoding on the first data packet and the second data packet. The first transport block is the same as the second transport block. By using the method and the apparatus provided in the embodiments of the present invention, data transmission reliability in a multi-band transmission scenario can be improved.

16 Claims, 6 Drawing Sheets

(58) Field of Classification Search
CPC ....... H04L 5/0094; H04L 1/1822; H04L 1/04; H04W 28/04; H04W 72/1273; H04W 72/1289; H04W 72/04
See application file for complete search history.

(56) References Cited

U.S. PATENT DOCUMENTS

| | | | |
|---|---|---|---|
| 11,101,932 B2* | 8/2021 | Beale | .................... H04L 1/1816 |
| 2011/0305213 A1 | 12/2011 | Löhr et al. | |
| 2013/0163543 A1* | 6/2013 | Freda | ................ H04W 72/0406 |
| | | | 370/329 |
| 2014/0341050 A1 | 11/2014 | Luo et al. | |

FOREIGN PATENT DOCUMENTS

| | | |
|---|---|---|
| EP | 3145261 A1 | 3/2017 |
| WO | 2014171754 A1 | 10/2014 |

OTHER PUBLICATIONS

Huawei et al.: "MAC Structure and Operation for URLLC", 3GPP Draft; R2-1700176, vol. Ran WG2, No. Spokane, USA; Jan. 17, 2017 Jan. 19, 2017, Jan. 17, 2017, 5 pages.
Intel Corporation: "Packet duplication for URLLC within a gNB", 3GPP Draft; R2-1701720, vol. Ran WG2, No. Athens, Greece; Feb. 13, 2017 Feb. 17, 2017, Feb. 12, 2017, 3 pages.

* cited by examiner

COMMUNICATION METHOD AND APPARATUS

CROSS-REFERENCE TO RELATED APPLICATIONS

This application is a continuation of International Application No. PCT/CN2017/103177, filed on Sep. 25, 2017, the disclosure of which is hereby incorporated by reference in its entirety.

TECHNICAL FIELD

This application relates to the communications field, and in particular, to a communication method and an apparatus in the communications field.

BACKGROUND

In a long term evolution (LTE) system, a hybrid automatic repeat request (HARQ) is introduced into a transmit end. The HARQ is a technology that combines error correction coding and an automatic repeat request (ARQ). On one hand, the transmit end adds redundant information by using the error correction coding, so that a receive end can correct some errors during decoding, thereby reducing a quantity of retransmissions (avoiding a case in which retransmission needs to be performed once any error occurs). On the other hand, for an error that cannot be corrected by using the error correction coding, the receive end requests, by using an ARQ mechanism, the transmit end to retransmit data. A basic unit of HARQ retransmission is a transport block (TB). One TB corresponds to a data block including one media access control (MAC) layer packet data unit (PDU). After the TB is encoded, a data packet that can be transmitted on a physical layer is formed. TBs carried by data packets in a same HARQ process are the same.

For a downlink HARQ, a network device sends a TB through a physical downlink shared channel (PDSCH), and sends downlink control information through a physical downlink control channel (PDCCH). The downlink control information indicates a HARQ process number corresponding to the TB and scheduling information of a data packet carrying the TB. The scheduling information may include a time-frequency resource, a modulation and coding scheme (MCS) index, and the like that are used by the data packet. A terminal device uses an error detection code to detect whether an error occurs in a received data packet. If there is no error, the terminal device sends an acknowledgement (ACK) feedback to the network device; or if there is an error, the terminal device stores the received error data packet in a HARQ buffer, and sends a negative acknowledgement (NACK) feedback to the network device. After receiving the NACK, the network device retransmits a data packet carrying the same TB.

In LTE, the network device may use a plurality of HARQ processes in parallel, and distinguish, by using HARQ process numbers that correspond to TBs, and that are in the downlink control information, the TBs to which the plurality of processes belong. Specifically, after sending a data packet carrying a TB corresponding to one HARQ process number, the network device stops sending and waits for the acknowledgement ACK feedback/negative acknowledgement NACK feedback from a receiver. When waiting for feedback corresponding to a HARQ process, the network device may use another HARQ process to transmit a different TB, so that equivalent continuous transmission is implemented. The HARQ processes together form a HARQ entity.

In an existing carrier aggregation (CA) technology, the network device may send downlink data to the terminal device by using a plurality of CCs. However, in the CA, a HARQ entity on each CC is independent from each other, which means that a data packet sent by the network device on each CC corresponds to a separate HARQ process on the CC. Before decoding, the terminal device cannot identify a relationship among a plurality of data packets that carry a plurality of transport blocks and that are received on different CCs.

SUMMARY

Embodiments of the present invention provide a communication method and an apparatus, to improve data transmission reliability in a multi-band transmission scenario.

According to a first aspect, an embodiment of the present invention provides a communication method. A terminal device receives first downlink control information from a network device, where the first downlink control information includes a first hybrid automatic repeat request (HARQ) process number. The terminal device receives, on a first frequency band, a first data packet carrying a first transport block, and receives, on a second frequency band, a second data packet carrying a second transport block, where the first HARQ process number corresponds to the first transport block on the first frequency band and the second transport block on the second frequency band, and the first transport block is the same as the second transport block. The terminal device performs joint decoding on the first data packet and the second data packet.

The terminal device can obtain the transport blocks (that is, the foregoing first transport block and second transport block) by performing joint decoding on the first data packet and the second data packet.

According to a second aspect, an embodiment of the present invention provides a communication method. A network device sends first downlink control information to a terminal device, where the first downlink control information includes a first hybrid automatic repeat request (HARQ) process number. The network device sends, on a first frequency band, a first data packet carrying a first transport block, and sends, on a second frequency band, a second data packet carrying a second transport block to the terminal device, where the first HARQ process number corresponds to the first transport block on the first frequency band and the second transport block on the second frequency band, and the first transport block is the same as the second transport block.

By using the method provided in this embodiment, the network device identifies a plurality of transport blocks on different frequency bands by using a same HARQ process number. The plurality of transport blocks are the same, so that the terminal device can identify, based on the HARQ process number, data packets that carry same transport blocks and that are on a plurality of frequency bands, and perform joint decoding on the plurality of data packets carrying the plurality of transport blocks corresponding to the same process number. The plurality of data packets carrying the same transport blocks include more redundant information. Therefore, more redundant information can be used to reduce energy of an interference noise by performing joint decoding on the plurality of data packets, so that an error rate of downlink data transmission is reduced, thereby improving reliability of the downlink data transmission.

In one embodiment, before receiving acknowledgement feedback information that corresponds to the first transport block and the second transport block and that is sent by the network device, the terminal device receives, on the first frequency band, a third data packet carrying a third transport block. Correspondingly, the network device sends, on the first frequency band, the third data packet carrying the third transport block, where the third transport block corresponds to the first HARQ process number, and the third transport block is different from the first transport block.

In one embodiment, before the terminal device receives the acknowledgement feedback information that corresponds to the first transport block and the second transport block and that is sent by the network device, the first HARQ process number is available on the first frequency band. That is, when HARQ processes corresponding to the first transport block and the second transport block do not finish, the network device can identify, on the first frequency band, a different HARQ process by using the first HARQ process number. For example, the network device can send, on the first frequency band, the third data packet carrying the third transport block, where the third transport block corresponds to the first HARQ process number, and the third transport block is different from the first transport block.

By using the method provided in this embodiment, when the HARQ processes corresponding to the first transport block and the second transport block do not finish, the network device can identify, on the first frequency band and by using the first HARQ process number, a different HARQ process that belongs to a HARQ entity on the first frequency band. It indicates that the first HARQ process number corresponding to the first transport block and the second transport block does not occupy a HARQ process that has the same HARQ process number and that is on the first frequency band. For example, in the method in this embodiment, the first HARQ process number may further be used to send a data packet carrying a transport block different from the first transport block. Therefore, in the method provided in this embodiment, when multi-band joint transmission is performed, occupying all same HARQ process numbers on all transmission frequency bands can be avoided, thereby reducing impact on data transmission on a frequency band. That is, a quantity of HARQ process numbers that can be used at the same time on some transmission frequency bands is not reduced, and a system total throughput is ensured.

In one embodiment, the first frequency band and the second frequency band belong to a first frequency band set, and the first frequency band set includes at least two frequency bands. The terminal device receives, on the second frequency band, the first downlink control information. Correspondingly, the network device sends, on the second frequency band, the first downlink control information. Before performing joint decoding on the first data packet and the second data packet, the terminal device determines, based on the second frequency band on which the first downlink control information is located, that a HARQ process number corresponding to the first transport block on the first frequency band is the first HARQ process number, that is, determine that a HARQ process number corresponding to the first transport block on the first frequency band included in the first frequency band set to which the second frequency band belongs is the first HARQ process number.

In the embodiment, the network device sends, on the second frequency band, the first downlink control information. The terminal device determines, based on a frequency band on which the first downlink control information is located, that a HARQ process number corresponding to the first transport block on the first frequency band that belongs to a same frequency band set is the first HARQ process number, so that additional signaling indication from the network device is not required, thereby reducing signaling overheads.

In one embodiment, the first frequency band and the second frequency band belong to a first frequency band set, and the first frequency band set includes at least two frequency bands. After receiving the first downlink control information from the network device, the terminal device determines, based on the second frequency band, that a HARQ process number corresponding to a transport block on the second frequency band can be used by another frequency band other than the second frequency band in the at least two frequency bands. Further, the terminal device can determine that a HARQ process number corresponding to the first transport block on the first frequency band is the first HARQ process number.

In some embodiments, the first frequency band set may be predefined.

In some embodiments, the first frequency band set may be configured by using higher layer signaling.

In some embodiments, the first downlink control information further includes scheduling information of the first data packet and the second data packet. In the embodiment, the first downlink control information simultaneously schedules the first data packet on the first frequency band and the second data packet on the second frequency band, and indicates that the first transport block and the second transport block correspond to a same HARQ process number. The terminal device identifies, based on the scheduling information included in the first downlink control information, data packets that are on different frequency bands and that correspond to same transport blocks, so that a complexity of scheduling multi-band joint transmission is reduced, and overheads of downlink control signaling is reduced.

In the embodiment, the terminal device, determines, based on a frequency band on which the first downlink control information is received, that the first HARQ process number corresponding to the first transport block and the second transport block can identify a different HARQ process on another frequency band other than the frequency band. In the embodiment, the network device sends, on the second frequency band, the first downlink control information. The terminal device simultaneously determines the scheduling information of the first data packet and the second data packet based on the first downlink control information, so that additional signaling indication from the network device is not required, thereby reducing signaling overheads.

In one embodiment, before receiving, on the second frequency band, the second data packet sent by the network device, the terminal device receives second downlink control information from the network device. Correspondingly, the network device sends the second downlink control information to the terminal device. The second downlink control information includes the first HARQ process number, scheduling information of the first data packet, and first indication information. The first downlink control information further includes scheduling information of the second data packet, where the first indication information indicates that the first HARQ process number is a HARQ process number used by the second frequency band.

In the embodiment, the first frequency band and the second frequency band belong to a first frequency band set, and the first frequency band set includes at least two frequency bands. Before receiving the first downlink control information from the network device, the terminal device receives indication information of the first frequency band set and/or indication information of the second frequency band by using first signaling. Correspondingly, the network device sends the indication information of the first frequency band set and the indication information of the second frequency band by using the first signaling. A frequency band other than the second frequency band in the at least two frequency bands can use a HARQ process number corresponding to a transport block on the second frequency band.

In some embodiments, the first signaling may be higher layer signaling.

According to a third aspect, an embodiment of the present invention provides a wireless apparatus. The wireless apparatus is configured to perform functions of implementing behavior of the terminal device in the foregoing methods. The functions may be implemented by hardware, or may be implemented by hardware executing corresponding software. The hardware or software includes one or more units corresponding to the foregoing functions.

In one embodiment, a structure of the terminal device includes a transceiver, a processor, and a memory coupled to the processor. The transceiver is configured to: support communication between the terminal device and a network device, send information or signaling related in the foregoing method to the network device, and receive information or signaling sent by the network device. The processor and the memory coupled to the processor are configured to perform the functions of implementing behavior of the terminal device in an actual application of the foregoing methods.

According to a fourth aspect, an embodiment of the present invention provides a network device. The network device is configured to perform functions of implementing behavior of the network device in the foregoing methods. The functions may be implemented by hardware, or may be implemented by hardware executing corresponding software. The hardware or software includes one or more units corresponding to the foregoing functions.

In one embodiment, a structure of the network device includes a transceiver, a processor, and a memory coupled to the processor. The transceiver is configured to: support communication between a terminal device and the network device, send information or signaling related in the foregoing method to the terminal device, and receive information or signaling sent by the terminal device. The processor and the memory coupled to the processor are configured to perform the functions of implementing behavior of the network device in an actual application of the foregoing methods.

According to a fifth aspect, a communications apparatus is provided. The communications apparatus is configured to perform functions of implementing behavior of the terminal device or that of the network device in an actual application of the foregoing methods. The functions may be implemented by hardware, or may be implemented by hardware executing corresponding software. The hardware or software includes one or more units corresponding to the foregoing functions.

According to a sixth aspect, a computer storage medium including an instruction is provided. When the computer storage medium is run on a computer, the computer is enabled to perform functions of implementing behavior of the terminal device or that of the network device in an actual application of the foregoing methods.

DESCRIPTION OF EMBODIMENTS

Figure 1:
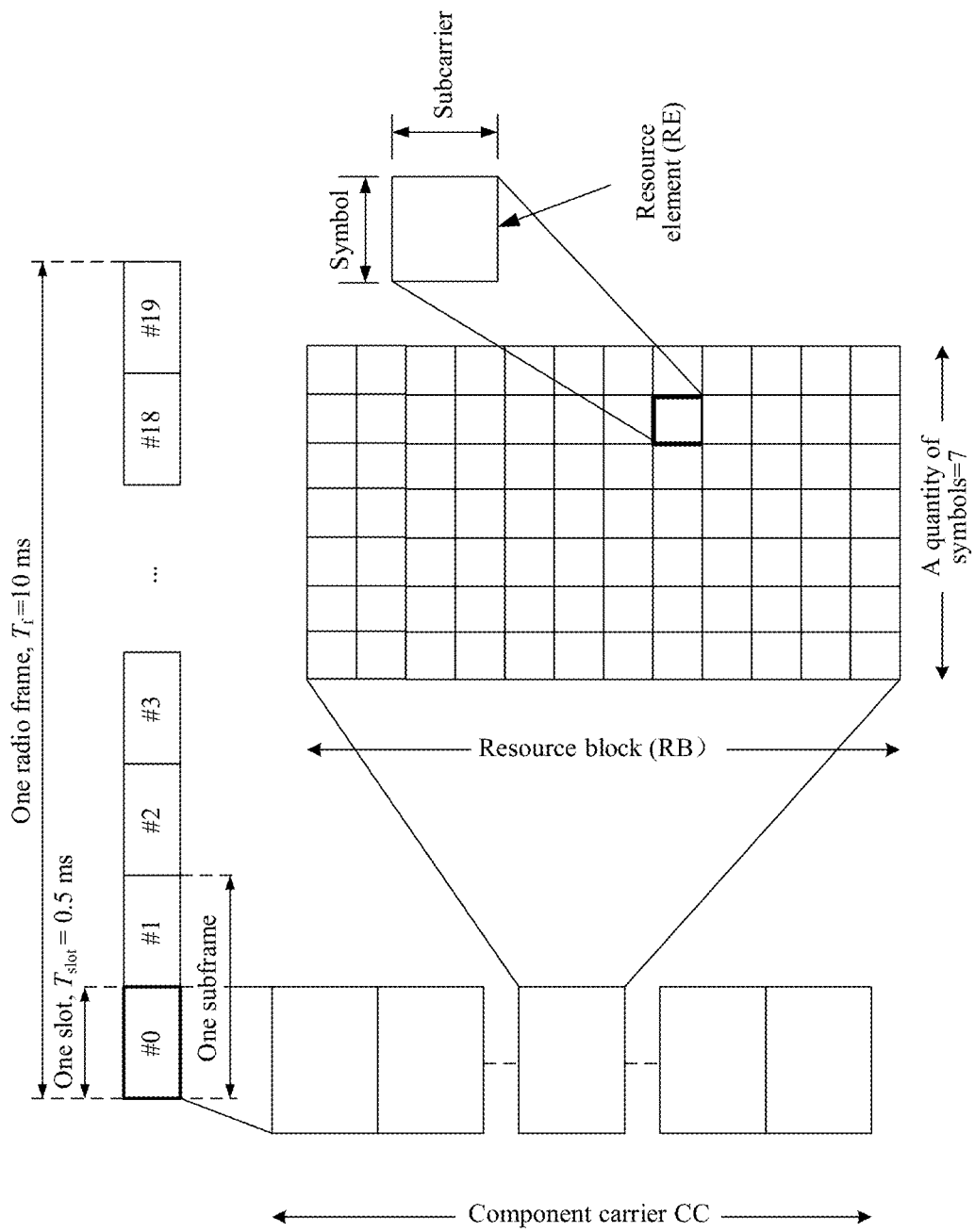
FIG. 1 is a schematic structural diagram of a radio frame in an LTE system.

The following describes embodiments of the present invention with reference to the accompanying drawings.

In the embodiments of the present invention, "one" means a single individual, but does not indicate that "one" needs to be only one individual, and cannot be applied to another individual. For example, in the embodiments of the present invention, "one terminal device" means a terminal device, but does not mean that "one terminal device" can only be applied to a specific terminal device. In this application, terms "system" and "network" can be interchangeably used.

In this application, a reference of "one embodiment" (or "one implementation") or "an embodiment" (or "an implementation") means that a specific feature, structure, characteristic and the like described in the embodiments are together included in at least one embodiment. Therefore, "in one embodiment" or "in an embodiment" that appears in various locations in this specification does not all indicate that a same embodiment is referred to.

Further, in the embodiments of the present invention, when referring to "A and/or B" and "at least one of A and B", the term "and/or" and "at least one" includes any one of three solutions, such as a solution including A but not including B, a solution including B but not including A, and a solution including both two options: A and B. In another example, when referring to "A, B, and/or C" and "at least one of A, B, and/or C", the phrase includes any one of seven solutions, such as a solution including A but not including B and C, a solution including B but not including A and C, a solution including C but not including A and B, a solution including A and B but not including C, a solution including B and C but not including A, a solution including A and C but not including B, and a solution including all three options: A, B, and C. A person with ordinary skill in the art or the related art can easily understand that, for another similar description, the embodiments of the present invention all can be understood in the foregoing manner.

It should be understood that technical solutions in the present invention can be applied to any communications system, such as a long term evolution (LTE) system in release 10 or a higher version, or a future fifth generation (5G) communications system, that supports a carrier aggregation (CA) or multi-band transmission.

The communications system described in the embodiments of the present invention is used to more clearly describe the technical solutions in the embodiments of the present invention, and is not intended to limit the technical solutions provided in the embodiments of the present invention. A person of ordinary skill in the art may know that with evolution of a communications system and appearance of a new system scenario, the technical solutions provided in the embodiments of the present invention are also applicable to similar technical problems.

The fifth generation (5G) mobile communications system technology and standard are already under research and establishment. An important technical requirement of ultra-reliable and low-latency communication (URLLC) is introduced into 5G. URLLC, a new service type, requires that transmission is completed in 1 ms (low latency), and a success rate needs to reach 99.999% (that is, an error rate of 10E-5, and high reliability). From a perspective of compatibility, 5G includes a branch compatible with LTE continuous evolution. That is, 5G needs to use an existing LTE system architecture, and implement a URLLC service in an evolved LTE system. In the existing LTE system, an error rate of downlink data transmission cannot satisfy a requirement of the URLLC service on high reliability, and therefore, the error rate needs to be further reduced. Usually, a wider spectral bandwidth that is scheduled by a network device to a terminal device and that is used for sending a downlink data packet indicates more redundant information included in the data packet, and a correspondingly lower encoding rate. This increases reliability of the data packet/ reduces a transmission error rate during decoding. However, there is a limitation for a system spectral bandwidth. A maximum bandwidth of each component carrier (CC) is 20 MHz. In some cases, even if the network device uses all the bandwidth of the CC to send downlink data to one terminal device, redundant information included in the data packet is not sufficient. Therefore, during decoding, the error rate of the data packet is not sufficiently low, and the required reliability of the URLLC service cannot be satisfied.

In the embodiments of the present invention, a carrier aggregation (CA) technology is introduced into a URLLC scenario. In the CA, the network device allocates a plurality of CCs to one terminal device and sends downlink data to the terminal device by using the plurality of CCs. FIG. 1 shows a possible structure of a time-frequency resource on one CC. However, in an existing carrier aggregation technology, as described in the background, a HARQ entity on each CC is independent from each other, which means that before decoding, the terminal device cannot distinguish a relationship among a plurality of data packets that carry a plurality of transport blocks (TB) and that are received on different CCs. The following describes the problem with reference to a HARQ process.

Figure 2:
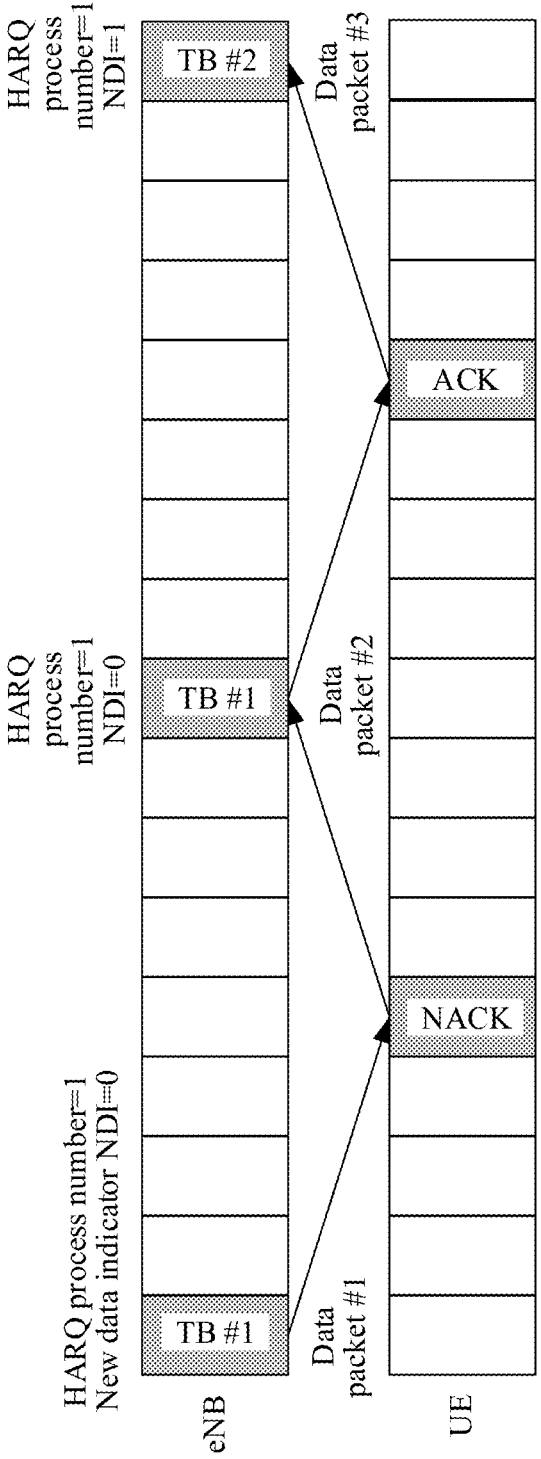
FIG. 2 is a simple schematic diagram of a HARQ protocol.

FIG. 2 is a simple schematic diagram of a downlink HARQ process. A network device sends a data packet #1 carrying a TB #1 to a terminal device. Downlink control information used to schedule the data packet #1 includes a HARQ process number and a new data indicator (NDI). The downlink control information and the data packet #1 are sent together. For example, a HARQ process number corresponding to the TB #1 is 1, and an NDI corresponding to the TB #1 is 0. After receiving the data packet #1, the terminal device decodes the data packet #1. If the decoding succeeds, the terminal device sends an acknowledgement (ACK) feedback to the network device; or if the decoding fails, the terminal device sends a negative acknowledgement (NACK) feedback to the network device. In FIG. 2, a decoding process fails. The terminal device feeds back a NACK and requests the network device to retransmit the TB #1. After receiving the NACK from the terminal device, the network device retransmits a data packet #2 carrying the TB #1, and uses a HARQ process number and an NDI that are same as those in initial transmission, to indicate that this transmission is retransmission. In other words, in this case, the data packet #2 and the data packet #1 carry the same TBs. The terminal device correctly decodes the data packet #2, and sends an ACK feedback to the network device. After receiving the ACK feedback from the terminal device, the network device finishes a HARQ process corresponding to the TB #1. The network device transmits a TB #2 by using the same HARQ process number. For example, in FIG. 2, the network device sends a data packet #3 carrying the TB #2, a HARQ process number corresponding to the TB #2 is 1, and an NDI corresponding to the TB #2 is 1. Downlink control information corresponding to the data packet #2 and downlink control information corresponding to the data packet #3 include the same HARQ process number and different NDIs. This is referred to as NDI toggling. After receiving the data packet #3 including NDI toggling information, the terminal device determines that the data packet #3 and the data packet #2 carry different TBs, that is, the terminal device determines that the HARQ process corresponding to the TB #1 finishes. It should be understood that, as in the foregoing description, that the terminal device receives the NDI toggling information is referred to as that the terminal device receives an acknowledgement feedback corresponding to a TB (TB #1). For example, after receiving the acknowledgement feedback corresponding to the TB #1, the terminal device determines that the HARQ process corresponding to the TB #1 finishes. The HARQ process number 1 is used to identify a next HARQ process corresponding to a different TB, such as the TB #2.

With reference to the foregoing example, it can be learned that in each HARQ entity, one TB is bound to one HARQ process number. Only after the TB finishes transmission or exceeds a maximum quantity of retransmissions, that is, only after the HARQ process finishes, the HARQ process number can be used by another TB. In an LTE system supporting the carrier aggregation, a HARQ entity on each component carrier (CC) is independent from each other. That is, HARQ process numbers used on different CCs are unrelated. A HARQ process number used on a different CC is only used on the CC. However, in the solution, when the carrier aggregation is directly applied to a URLLC service, there may still be a problem that reliability cannot reach a URLLC requirement. Therefore, an embodiment of the present invention provides a solution that can improve data transmission reliability.

Figure 3:
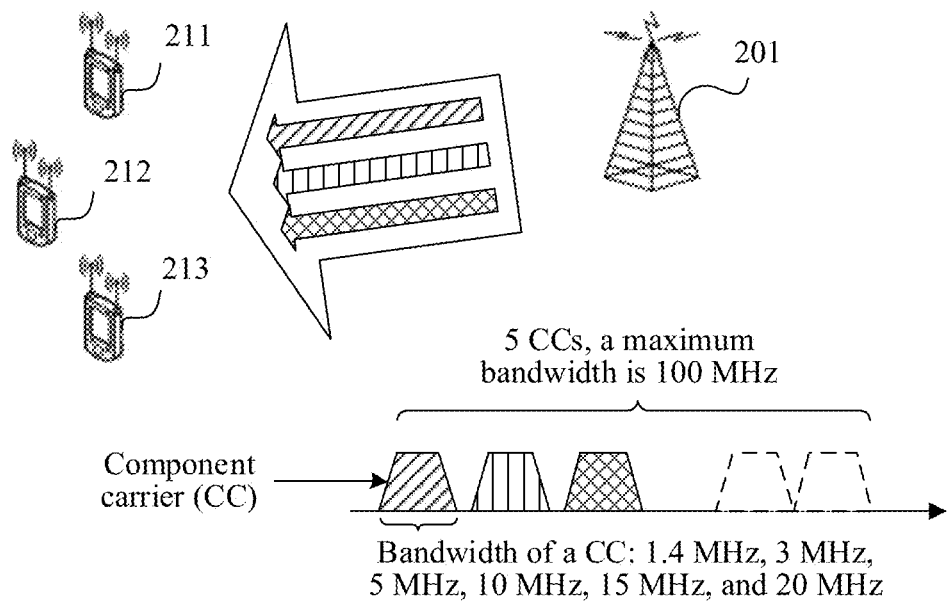
FIG. 3 is a schematic diagram of a wireless communications system according to an embodiment of the present invention.

FIG. 3 shows an application scenario according to an embodiment of the present invention. The scenario includes a network device 201, and terminal devices 211 to 213 that are located in coverage of the network device 201 and that communicate with the network device 201.

It should be understood that in this embodiment of the present invention, a terminal device may alternatively be referred to as user equipment (UE), a mobile station (MS), a mobile terminal, or the like. The terminal device can communicate with one or more core networks through a radio access network (RAN). For example, the terminal device is a device having wireless receiving and sending functions. The device may be deployed on the land, including an indoor device, an outdoor device, a handheld device, or a vehicle-mounted device; or may be deployed on the water (for example, on a steamer); or may be deployed in the air (for example, on an air plane, a balloon, or a satellite). The terminal device may be a mobile phone (mobile phone), a tablet computer (for example, Pad), a computer having wireless receiving and sending functions, a virtual reality (VR) terminal device, an augmented reality (AR) terminal device, a wireless terminal in industrial control, a self-driving wireless terminal, a wireless terminal in remote surgery (also called remote medical), a wireless terminal in a smart grid, a wireless terminal in transportation safety, a wireless terminal in a smart city, a wireless terminal in a smart home, or the like.

In this embodiment of the present invention, the network device (such as the network device 201) is an apparatus deployed in the radio access network and configured to provide a wireless communication function for the terminal device. The network device may include macro base stations, micro base stations (which are also referred to as small cells), relay stations, access points, and the like in various forms. The network device may be a base transceiver station (BTS) in GSM or CDMA, a NodeB (NB) in WCDMA, an evolved NodeB (eNB or e-NodeB) in LTE or eLTE, or a gNodeB gNB ((next) generation NodeB) in a next generation mobile network, such as 5G.

Carrier aggregation CA in LTE is used as an example. In CA, two or more CCs are aggregated together to support a wider transmission bandwidth. A maximum transmission bandwidth supported by a Release-10 version of an LTE system is 100 MHz (that is, the CA supports a maximum of five CCs). In a later version, a quantity of CCs involved in the CA is further increased. As shown in FIG. 3, a maximum bandwidth of each CC is 20 MHz, and a maximum 110 resource blocks (RB) can be used. The CA supports aggregation of different CCs that may be CCs having a same bandwidth or different bandwidths (such as, 1.4 MHz, 3 MHz, 5 MHz, 10 MHz, 15 MHz, and 20 MHz), and may be CCs on a same band or different bands. The network device configures a plurality of CCs to the terminal device, and sends downlink data by using the CCs. The communication scenario shown in FIG. 3 is an example of a communication scenario to which the embodiments of the present invention can be applied, but is not intended to limit the application scenario of the embodiments of the present invention.

The terminal device can support one or more wireless technologies, such as 5G, LTE, WCDMA, CDMA, 1×, Time Division-Synchronous Code Division Multiple Access (TS-SCDMA), GSM, and 802.11, used for wireless communication. The terminal device supports the carrier aggregation technology.

A plurality of terminal devices may perform a same service or different services, such as a mobile broadband service, an enhanced mobile broadband (eMBB) service, an ultra-reliable and low-latency communications (URLLC) service of a terminal device.

Figure 4:
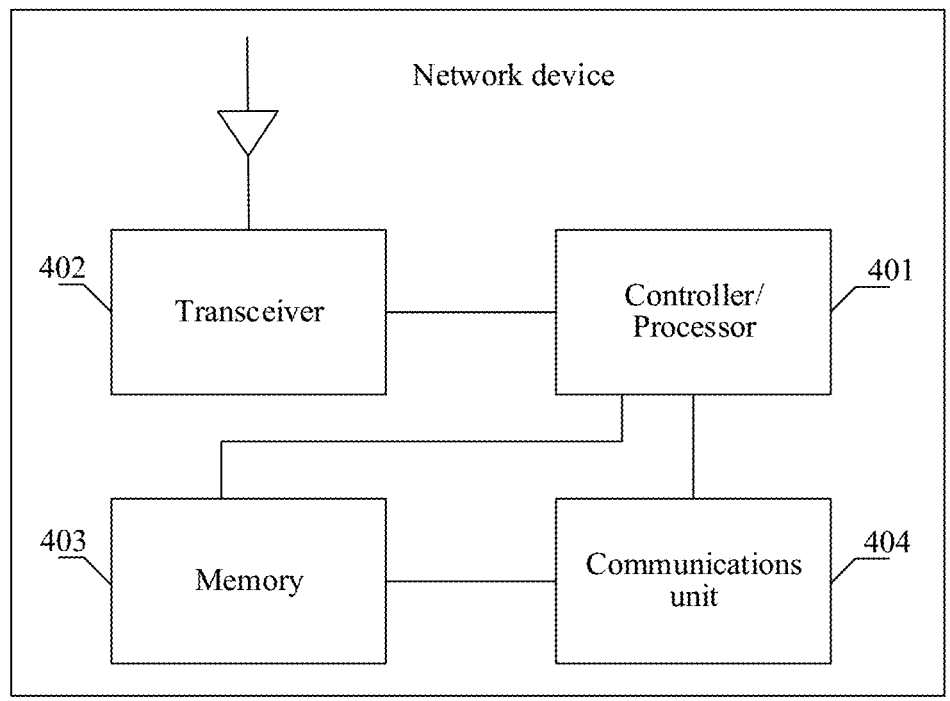
FIG. 4 is a possible schematic structural diagram of a network device in the foregoing wireless communications system.

Further, a possible schematic structural diagram of the foregoing network device 201 may be shown in FIG. 4. The network device 201 can perform a method provided in an embodiment of the present invention. The network device 201 may include: a controller or processor 401 (the following uses the processor 401 as an example for description), and a transceiver 402. The controller/processor 401 sometimes may alternatively be referred to as a modem processor. The modem processor 401 may include a baseband processor (BBP) (which is not shown in the figure). The baseband processor processes a digitized received signal to extract information or data bits delivered in the signal. In this way, the baseband processor is usually implemented, on demand or as expected, in one or more digital signal processors (DSP) in the modem processor 401 or implemented as separate integrated circuits (IC).

The transceiver 402 may be configured to: support information receiving and sending between the network device 201 and the terminal device, and support wireless communication between terminal devices. The processor 401 may further be configured to perform a function that enables communication between various terminal devices and another network device. In an uplink, an uplink signal from the terminal device is received by using an antenna, demodulated by the transceiver 402, and further processed by the processor 401 to recover service data and/or signaling information that are/is sent by the terminal device. In a downlink, service data and/or signaling messages are/is processed by the terminal device, and modulated by the transceiver 402 to generate a downlink signal, and the downlink signal is transmitted to the terminal device using an antenna. The network device 201 may further include a memory 403 that may be configured to store program code and/or data that are/is of the network device 201. The transceiver 402 may include an independent receiver circuit and transmitter circuit, or may implement receiving and sending functions by using one circuit. The network device 201 may further include a communications unit 404, configured to support communication between the network device 201 and another network entity, for example, configured to support communication between the network device 201 and a network device in a core network or the like.

In some embodiments, the network device may further include a bus. The transceiver 402, the memory 403, and the communications unit 404 may be connected to the processor 401 through the bus. For example, the bus may be a peripheral component interconnect (PCI) bus, an extended industry standard architecture (EISA) bus, or the like. The bus may include an address bus, a data bus, a control bus, and the like.

Figure 5:
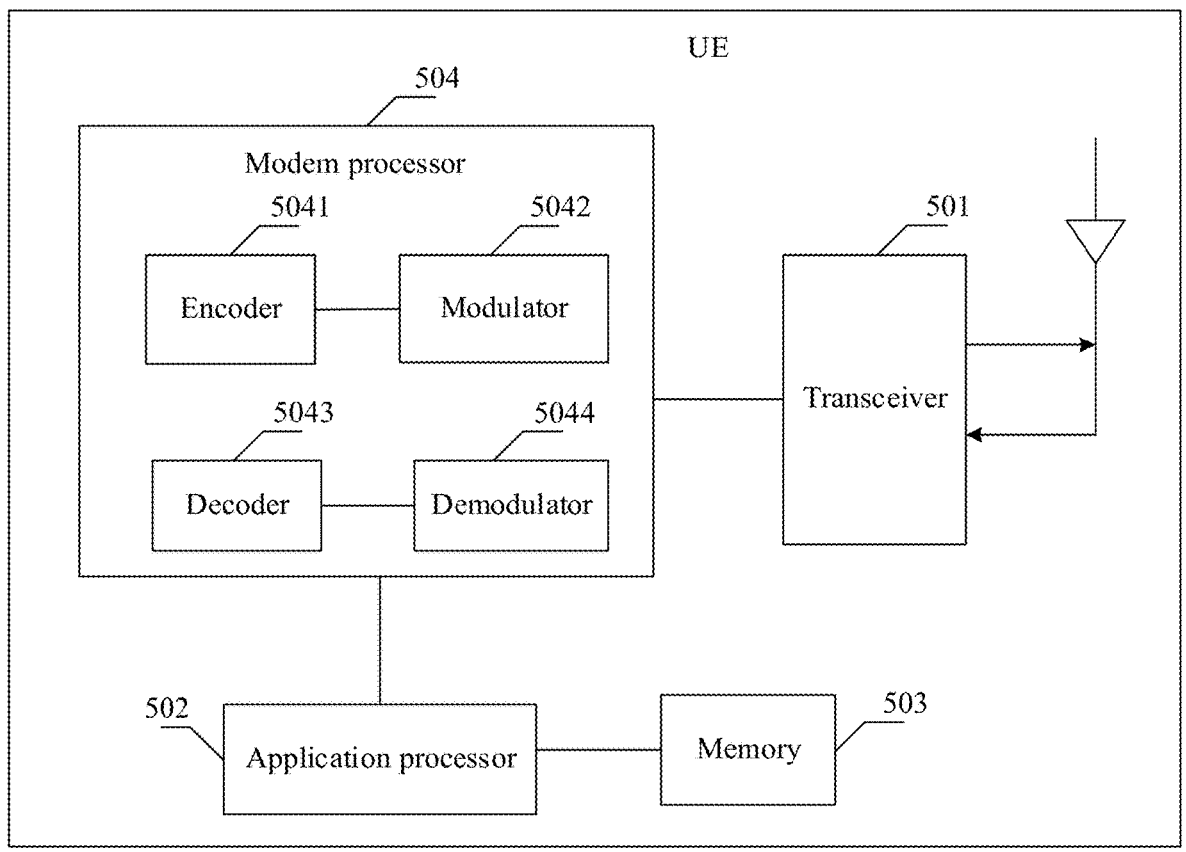
FIG. 5 is a possible schematic structural diagram of a terminal device in the foregoing wireless communications system.

FIG. 5 is a possible schematic structural diagram of a terminal device in the foregoing wireless communications system. The terminal device can perform a method provided in an embodiment of the present invention. The terminal device may be any one of the three terminal devices 211 to 213. The terminal device includes a transceiver 501, an application processor 504, a memory 503, and a modem processor 504.

The transceiver 501 may adjust (for example, perform analog conversion, filtering, amplification, and up-conversion on) an output sample and generate an uplink signal. The uplink signal is transmitted to the base station in the foregoing embodiments by using an antenna. In a downlink, the antenna receives a downlink signal transmitted by the network device. The transceiver 501 may adjust (for example, perform filtering, amplification, down-conversion, and digitalization on) a signal received from the antenna and provide an input sample.

The modem processor 504 sometimes may alternatively be referred to as a controller or a processor, and may include a baseband processor (BBP) (which is not shown in the figure). The baseband processor processes a digitized received signal to extract information or data bits delivered in the signal. The BBP is usually implemented, on demand or as expected, in one or more digital signal processors in the modem processor 504 or implemented as separate integrated circuits (IC).

In a design, the modem processor 504 may include an encoder 5041, a modulator 5042, a decoder 5043, and a demodulator 5044. The encoder 5041 is configured to encode a to-be-sent signal. For example, the encoder 5041 may be configured to: receive service data and/or a signaling message that are/is to be sent in an uplink, and perform processing (for example, formatting, encoding, or interleaving) on the service data and the signaling message. The modulator 5042 is configured to modulate an output signal of the encoder 5041. For example, the modulator may perform processing such as symbol mapping and/or modulating on the output signal (data and/or signaling) of the encoder, and provide an output sample. The demodulator 5044 is configured to demodulate an input signal. For example, the demodulator 5044 processes an input sample and provides symbol estimation. The decoder 5043 is configured to decode a demodulated input signal. For example, the decoder 5043 performs processing such as de-interleaving and/or decoding on the demodulated input signal, and outputs a decoded signal (data and/or signaling). The encoder 5041, the modulator 5042, the demodulator 5044, and the decoder 5043 may be implemented by the integrated modem processor 504. These units perform processing based on a radio access technology used in a radio access network.

The modem processor 504 receives, from the application processor 502, digitalized data that can represent voice, data, or control information, and processes the digitalized data for transmission. The modem processor can support one or more of a plurality of wireless communication protocols in a plurality of communications systems, such as LTE, new radio, a universal mobile telecommunications system (UMTS), and high speed packet access (HSPA). In some embodiments, the modem processor 504 may alternatively include one or more memories.

In some embodiments, the modem processor 504 and the application processor 502 may be integrated in one processor chip.

The memory 503 is configured to store program code (which is sometimes alternatively referred to as a program, an instruction, software, or the like) and/or data that are/is used to support the terminal device in communication.

It should be noted that the memory 503 may include one or more storage units, for example, may be a storage unit that is configured to store program code and that is in the processor 401 or the modem processor 504 or the application processor 502, or may be an external storage unit independent of the processor 401 or the modem processor 504 or the application processor 502, or may be a component including a storage unit in the processor 401 or the modem processor 504 or the application processor 502 and an external storage unit independent of the processor 401 or the modem processor 504 or the application processor 502.

The processor 401 and the modem processor 501 may be processors of a same type, or may be processors of different types. For example, the processor 401 and the modem processor 501 may be implemented in a central processing unit (CPU), a general purpose processor, a digital signal processor (DSP), an application-specific integrated circuit (ASIC), a field programmable gate array (FPGA) or another programmable logic device, a transistor logic device, a hardware component, another integrated circuit, or any combination thereof. The processor 401 and the modem processor 501 may implement or execute various examples of logical blocks, modules, and circuits that are described with reference to the content disclosed in the embodiments of the present invention. Alternatively, the processor may be a combination of devices that implement a calculation function, for example, including one microprocessor or a combination of a plurality of microprocessors, a combination of a DSP and a microprocessor, a system-on-a-chip (SOC), and the like.

A person skilled in the art can understand that various interpretive logical blocks, modules, circuits, and algorithms that are all described with reference to various aspects disclosed in this application can be implemented as electronic hardware, an instruction that is stored in the memory or another computer-readable medium and that is executed by a processor or another processing device, or a combination thereof. In an example, the device described in this specification can be used in any circuit, hardware component, IC, or IC chip. In this application, the disclosed memory may be a memory of any type and size, and may be configured to store needed information of any type. To clearly describe the interchangeability, the foregoing already generally describes various interpretive components, frames, modules, circuits, and operations in a functionality form of the memory. How this kind of functionality is implemented depends on a specific application, a design selection, and/or a design restrain on a whole system. A person skilled in the art can implement the described functionality in different manners for each specific application. However, this kind of implementation decision should not be interpreted as going beyond a scope of the present invention.

An embodiment of the present invention provides a communication method, to improve data transmission reliability in a multi-band transmission scenario. Further, in the method provided in this embodiment of the present invention, occupying HARQ process numbers on a plurality of frequency bands can be avoided, thereby reducing impact of multi-band transmission on single band data transmission.

It should be understood that a frequency band described in this embodiment of the present invention represents a segment of consecutive frequency domain resources that can be separately used for data transmission. The frequency band in this embodiment of the present invention may be a component carrier in a carrier aggregation (CA) technology, or may be a bandwidth part (BWP) in a 5G new radio (NR) system, where a bandwidth of each BWP is less than or equal to a maximum bandwidth supported by a terminal device, or may be another frequency band having a same concept in a future communications system.

In this embodiment of the present invention, data packets carrying same transport blocks carry same unencoded bit information. Herein, the unencoded bit may be a data service, such as file download or video transmission, transmitted between the network device and the terminal device, or may be a voice communication service. Data included in the transport blocks may be a data block of a media access control (MAC) layer packet data unit (PDU). After being encoded, the transport blocks may become different data packets, or certainly, may be same data packets. Therefore, the data packets carrying same transport blocks in this embodiment of the present invention may be the same or different. The following explains, by using Turbo coding used in an LTE system as an example, how same transport blocks become different data packets after encoding.

It should be noted that in a process in which a Turbo encoder is used to encode a transport block as a data packet, only when a transmitter (which is a network device in this example) further provides the encoder with an encoding rate of a data packet (that is, a ratio of a quantity of bits included in the transport block to a quantity of bits included in an encoded data packet) and a redundancy version number, the encoder can correctly perform encoding.

In the Turbo encoder, first, a transport block including N bits is encoded as a mother code with an encoding rate of ⅓, that is, a length of the mother code is 3N bits. The encoder then sequentially selects bits from the mother code based on the required encoding rate and redundancy version number, and forms a data packet. Herein, a rule of selecting bits from the mother code is determined by the redundancy version number, and a quantity of the selected bits are determined by the encoding rate. When the encoding rate is less than ⅓, some bits in the mother code do not appear in the data packet. Alternatively, when the encoding rate is greater than or equal to ⅓, all bits in the mother code appear in the data packet, and some bits may repeatedly appear in the data packet. Therefore, when same transport blocks go through the encoder, if redundancy version numbers, encoding rates, and modulation schemes are all the same, the data packets are the same; or if at least one of the redundancy version numbers, the encoding rates, and the modulation schemes are different, data packets are different.

Figure 6:
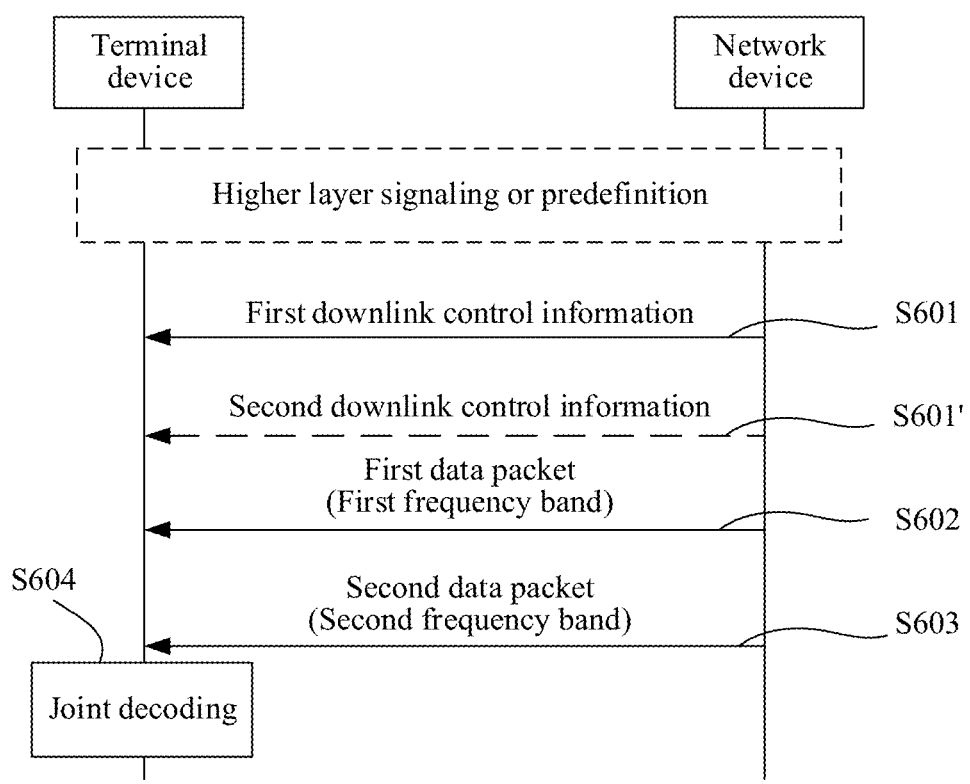
FIG. 6 is a schematic interaction diagram of a method according to an embodiment of the present invention.

FIG. 6 is a schematic interaction diagram of a communication method according to an embodiment of the present invention. In this embodiment, a network device sends, on at least two frequency bands that belong to a first frequency band set, data packets carrying same transport blocks to a terminal device, and the terminal device performs joint decoding on the data packets carrying the same transport blocks.

S601. The network device sends first downlink control information, and the terminal device receives the first downlink control information.

In the operation, the first downlink control information may include a first HARQ process number. The first HARQ process number corresponds to a first transport block and a second transport block, indicating that the first transport block and the second transport block belong to a same HARQ process. That is, the first transport block and the second transport block are the same.

Further, the first downlink control information may further include scheduling information of a first data packet that carries the first transport block. Herein, the scheduling information, for example, may include: information about a time-frequency resource that is on a first frequency band and that is used to send the first data packet, a modulation and coding scheme (MCS) index, and the like.

In some embodiments, the first downlink control information may further include scheduling information of a second data packet that is on a second frequency band and that carries the second transport block. The scheduling information may include information about a time-frequency resource that is on the second frequency band and that is used to send the second data packet, an MCS index, and the like. In this case, the first downlink control information simultaneously schedules data packets that carry same transport blocks and that are sent on two frequency bands. That is, two data packets are scheduled by using one piece of downlink control information, and the two data packets are respectively sent on different frequency bands and carry the same transport blocks.

In one embodiment, the network device schedules data packets on two frequency bands by using one piece of downlink control information, and the two data packets carry the same transport blocks. In one piece of downlink control information, a same information field, such as the first HARQ process number, of the two data packets can be reused, so that signaling overheads can be reduced.

In one embodiment, the terminal device can determine, based on a location of a frequency band on which the downlink control information is located, that a HARQ process number corresponding to the first transport block on the first frequency band is the first HARQ process number, thereby also reducing signaling overheads of notifying the process number corresponding to the first transport block.

In some embodiments, this embodiment of the present invention may further include operation S601': The network device sends second downlink control information, and the terminal device receives the second downlink control information.

Further, the second downlink control information may include the scheduling information of the first data packet, the first HARQ process number, and first indication information. The first HARQ process number belongs to a HARQ entity on the second frequency band.

In some embodiments, before sending the first downlink control information and the second downlink control information, the network device sends indication information of the first frequency band set and indication information of the second frequency band by using first signaling, where the first frequency band and the second frequency band belong to the first frequency band set, the first frequency band set includes at least two frequency bands, and a frequency band other than the second frequency band in the at least two frequency bands can use a HARQ process number corresponding to a transport block on the second frequency band. The first signaling may be higher layer signaling. The first signaling may be one piece of signaling or a plurality of pieces of signaling. That is, the indication information of the first frequency band set and the indication information of the second frequency band may be sent in one piece of signaling, or may be sent in different signaling. The higher layer signaling may be one or more of the following messages: a master information block (MIB) message, system information, and a radio resource control (RRC) message. Further, the system information may be a system information block (SIB) message, or may be a system information block message used to configure a random access channel (RACH) resource. The RRC message may be a public RRC message, that is, an RRC message sent to terminal devices in a cell, or may be a terminal device specific RRC message, that is, an RRC message sent to a specific terminal device.

In some embodiments, the indication information of the first frequency band set and the indication information of the second frequency band may be predefined by a communication network.

It can be understood that a sequence of operations S601 and S601' is not limited in this embodiment. Operation S601 may be performed before operation S601', or operation S601' may be performed before operation S601, or operations S601' and S601 may be performed at the same time.

It can be understood that this embodiment of the present invention uses two data packets as an example for description. However, this embodiment of the present invention is not limited to two data packets and two frequency bands. A person skilled in the art can understand, based on solutions of this embodiment of the present invention, that this embodiment of the present invention certainly is not limited to two data packets and two frequency bands.

Operation S602. The network device sends, on the first frequency band, the first data packet carrying the first transport block, and the terminal device receives, on the first frequency band, the first data packet.

Operation S603. The network device sends, on the second frequency band, the second data packet carrying the second transport block, and the terminal device receives, on the second frequency band, the second data packet.

It should be noted that a sequence of operations S602 and S603 is not limited in this embodiment. Operation S603 may be performed before operation S602, or operation S602 may be performed before operation S603, or operations S602 and S603 may be performed at the same time.

In this embodiment, the first data packet and the second data packet correspond to a same process number, that is, the first HARQ process number, indicating that the first data packet and the second data packet belong to a same HARQ process, and that the first transport block carried by the first data packet and the second transport block carried by the second data packet are the same. The data packets in the same HARQ process carry same transport blocks. The terminal device performs joint decoding on the data packets in the same HARQ process. More redundant information is included in a plurality of data packets carrying same transport blocks. Therefore, decoding reliability is increased, thereby improving downlink transmission reliability.

The first data packet and the second data packet carry same transport blocks. However, the first data packet and the second data packet may be same, or may be different. For example, after being encoded, the transport blocks may become different data packets because of different redundancy version numbers, encoding rates, and modulation schemes, or may form same data packets because of same encoding rates and modulation schemes. For example, in an LTE system, an initially transmitted data packet and a retransmitted data packet are usually different, but carry same transport blocks. Usually, encoding rates and modulation schemes that are of the data packets are the same, and only redundancy versions are different. Compared with joint decoding by using a plurality of data packets of a same redundancy version, joint decoding by using different redundancy versions is advantageous to improving system reliability. As in the foregoing descriptions of impact of redundancy versions on encoding, actually, different bits in a mother code are selected during encoding by using different redundancy versions. When the encoding rate is less than ⅓, some bits in the mother code do not appear in the data packet. Because different bits in the mother code are selected by using different redundancy versions, compared with transmitting only a single redundancy version, different redundancy versions may be used to recover the mother code, thereby reaching higher reliability.

The sending action in the foregoing operations may be implemented by the transceiver 402 of the foregoing network device 201, or may be implemented by the transceiver 402 controlled by the processor 401 of the foregoing network device 201.

The receiving action in the foregoing operations may be implemented by the transceiver 501 of the foregoing terminal device, or may be implemented by the transceiver 501 controlled by the modem processor 504 of the foregoing terminal device.

In some embodiments, before operation S603, this embodiment may further include: The terminal device determines the second frequency band.

Further, in this embodiment, a plurality of manners are provided to determine the second frequency band, that is, determine that the first HARQ process number belongs to a HARQ entity on the second frequency band.

In an implementation, the terminal device determines the second frequency band based on the second downlink control information, that is, determines that the first HARQ process number belongs to the HARQ entity on the second frequency band. In this implementation, the second downlink control information includes the first HARQ process number and the first indication information. The first indication information indicates that the first HARQ process number is a HARQ process number used by the second frequency band.

In an example, an information field of one bit is added in the second downlink control information. If the information field is in a first state, such as 0, it indicates that the first HARQ process number corresponding to the first transport block belongs to a HARQ entity on a frequency band carrying the first data packet, that is, a HARQ entity on the first frequency band. A specific transmission manner is the same as a transmission manner in an existing system. Alternatively, if the information field is in a second state, such as 1, it indicates that the first HARQ process number corresponding to the first transport block is a HARQ process number on the second frequency band, and belongs to a HARQ entity on the second frequency band. The network device may transmit another data packet carrying a different transport block by using, on the first frequency band, the first HARQ process number. That the information field is in the second state indicates that the first downlink control information includes the first indication information. The first state and the second state may be predefined.

In some embodiments, in this implementation, before receiving the first downlink control information, the terminal device further receives the indication information of the second frequency band by using the first signaling, and the terminal device determines the second frequency band based on the first indication information and/or the indication information of the second frequency band. The indication information of the second frequency band indicates that when the information field is in the second state, the first HARQ process number corresponding to the first transport block is a HARQ process number on the second frequency band. The first signaling may be higher layer signaling.

In another implementation, the terminal device determines the second frequency band based on the indication information that is of the second frequency band and that is included in the first downlink control information, that is, determines that the first HARQ process number belongs to the HARQ entity on the second frequency band. The first frequency band and the second frequency band belong to the first frequency band set, and the first frequency band set includes at least two frequency bands. For example, the first frequency band set may further include another frequency band other than the first frequency band and the second frequency band. In this implementation, the terminal device receives, on the second frequency band, the first downlink control information, where the first downlink control information includes the scheduling information of the first data packet and the second data packet. Further, the terminal device determines, based on the indication information that is of the second frequency band and that is included in the first downlink control information, that a HARQ process number corresponding to the first data packet that carries the first transport block and that is on the first frequency band is the first HARQ process number. To be specific, the terminal device can determine, based on the indication information of the second frequency band, that the first data packet and the second data packet belong to a same HARQ process, and the HARQ process is a HARQ process on the second frequency band.

In another implementation, the terminal device determines the second frequency band based on a frequency band on which the first downlink control information is located, that is, determines that the first HARQ process number belongs to the HARQ entity on the second frequency band.

The first frequency band and the second frequency band belong to the first frequency band set, and the first frequency band set includes at least two frequency bands. For example, the first frequency band set may further include another frequency band other than the first frequency band and the second frequency band. In this way, in this implementation, the terminal device receives, on the second frequency band, the first downlink control information, where the first downlink control information includes the scheduling information of the first data packet and scheduling information of the second data packet. Further, the terminal device can determine, based on that the first downlink control information is carried on the second frequency band, that a HARQ process number corresponding to the first data packet that carries the first transport block and that is on the first frequency band is the first HARQ process number. To be specific, the terminal device can determine, based on that the first downlink control information is carried on the second frequency band, that the first data packet and the second data packet belong to a same HARQ process, and the HARQ process is a HARQ process on the second frequency band. In this implementation, the first downlink control information does not need to include the indication information of the second frequency band. The network device implicitly indicates the second frequency band by using the frequency band carrying the first downlink control information, but does not need additional signaling indication from the network device, thereby reducing signaling overheads.

In the foregoing implementation, a HARQ process number corresponding to a transport block on the second frequency band can be used by another frequency band other than the second frequency band in the first frequency band set. For example, specifically, before receiving acknowledgement feedbacks corresponding to the first transport block and the second transport block, the terminal device receives, on the first frequency band, a third data packet carrying a third transport block. The third transport block also corresponds to the first HARQ process number. The terminal device can determine that the first transport block and the second transport block are same transport blocks, and that the third transport block is different from the first transport block. In this case, the first data packet that is on the first frequency band and that carries the first transport block corresponds to the first HARQ process number. However, the terminal device determines, based on that the first downlink control information is carried on the second frequency band or based on the second downlink control information, that the first HARQ process number belongs to the HARQ entity on the second frequency band, without affecting that the HARQ process number is used by another frequency band other than the second frequency band in the first frequency band set. To be specific, the first data packet carrying the first transport block and the second data packet carrying the second transport block that are scheduled by using the first downlink control information both belong to the HARQ process on the second frequency band. The first transport block and the second transport block are same. The network device may transmit a different transport block, such as the third transport block, on another frequency band in the first frequency band set by using the same HARQ process number.

It should be noted that before the terminal device receives acknowledgement feedback information corresponding to the first transport block and the second transport block, the first HARQ process number is available on the first frequency band. That is, the network device may send, on the first frequency band, the third data packet carrying the third transport block corresponding to the first HARQ process number. The third transport block and the first transport block are different. Alternatively, the network device may not send the third data packet.

Further, the first frequency band set may be pre-configured in the network device and the terminal device, or may be configured by the network device for the terminal device. For example, the network device may send information about the first frequency band set to the terminal device by using higher layer signaling.

The foregoing determining operations may be implemented by the modem processor 504 of the foregoing terminal device.

Operation S604. The terminal device performs joint decoding on the first data packet and the second data packet.

The "joint decoding" means that a plurality of data packets carrying same transport blocks are combined and then decoded, and the same transport blocks are obtained after the data packets are decoded.

The action in the operation may be implemented by the modem processor 504 of the foregoing terminal device.

Perform joint decoding on the plurality of data packets may mean a process in which a plurality of data packets corresponding to a transport block are first combined, to obtain one data packet having higher decoding reliability than a single data packet, and then the combined data packet is decoded. A method in which two data packets are combined as one data packet in the "joint decoding" depends on an encoding rule. Simple repeat transmission is used as an example. That is, if in two transmission processes, data packets transmitted by a transmit end are totally the same, a combining rule of the data packets is: Each symbol in a combined data packet is an average value of corresponding symbols in the two data packets before combination. In an averaging process, data energy carried by the data packets does not change, and energy of an interference noise is reduced. Therefore, the combined data packet has higher decoding reliability. It should be noted that a combined data packet may be larger than the data packet before combination (for example, when data packets having different redundancy versions are combined). A specific size also depends on the encoding rule. If the combined data packet becomes larger, it means that the combined data packet includes more redundant information. The redundant information may also improve decoding reliability of the combined data packet. Therefore, the network device and the terminal device perform the method 600 provided in this embodiment of the present invention, so that the network device identifies, by using a same HARQ process number, a plurality of data packets that carry a plurality of transport blocks and that are on different frequency bands. The plurality of transport blocks are the same, so that the terminal device can identify, based on the HARQ process number, data packets that carry same transport blocks and that are on a plurality of frequency bands, and perform joint decoding on the plurality of data packets carrying the plurality of transport blocks corresponding to the same process number. The plurality of data packets carrying the same transport blocks include more redundant information. Therefore, more redundant information can be used by performing joint decoding on the plurality of data packets, to reduce energy of the interference noise, so that an error rate of downlink data transmission is reduced, thereby improving reliability of the downlink data transmission. In addition, when the HARQ process corresponding to the first transport block and the second transport block does not finish, the network device can identify, on the first frequency band and by using the first HARQ process number, different HARQ processes that belong to a HARQ entity on the first frequency band. It indicates that the first HARQ process number corresponding to the first transport block and the second transport block does not occupy a HARQ process that has the same HARQ process number and that is on the first frequency band. For example, in the method in this embodiment, the first HARQ process number may further be used to send a data packet carrying a transport block different from the first transport block. Therefore, in the method provided in this embodiment, when multi-band joint transmission is performed, occupying all same HARQ process numbers on all transmission frequency bands can be avoided, thereby reducing impact on data transmission on a frequency band. That is, a quantity of HARQ process numbers that can be used at the same time on some transmission frequency bands is not reduced, and a system total throughput is ensured.

Figure 7:
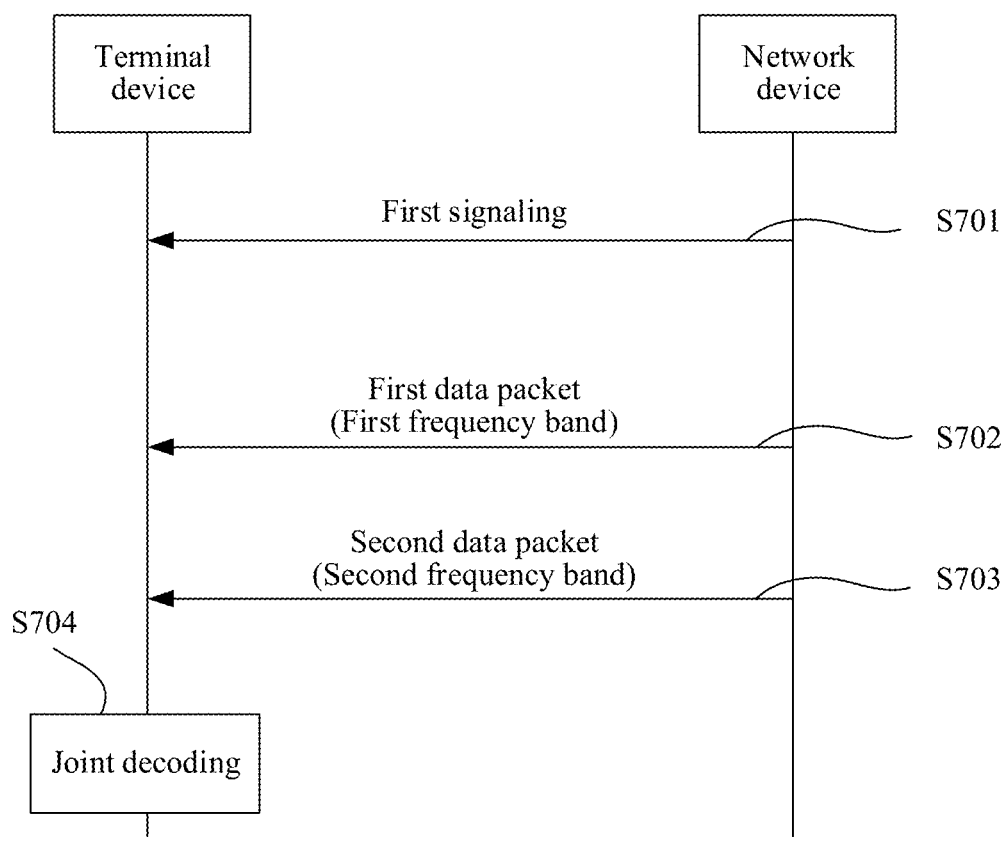
FIG. 7 is a schematic interaction diagram of a method according to an embodiment of the present invention.

In some embodiments, an embodiment of the present invention provides another communication method. The following describes the method with reference to FIG. 7.

Operation S701: A network device sends, by using first signaling, indication information of a first frequency band set and indication information of a first HARQ process number set to a terminal device. Correspondingly, the terminal device receives the first signaling. The first frequency band set includes at least two frequency bands. The at least two frequency bands may be used to transmit data packets carrying same transport blocks. The first HARQ process number set includes one or more HARQ process numbers. The one or more HARQ process numbers can be used to transmit, on a plurality of frequency bands, data packets carrying same transport blocks. The data packets carrying the same transport blocks correspond to a same HARQ process number on the plurality of frequency bands.

It should be noted that the first signaling is higher layer signaling. The first signaling may be one piece of signaling or a plurality of pieces of signaling. That is, the indication information of the first frequency band set and the indication information of the first HARQ process number may be sent in one piece of signaling, or may be sent in different signaling.

Operation S702. The network device sends, on a first frequency band, a first data packet carrying a first transport block, and the terminal device receives, on the first frequency band, the first data packet carrying the first transport block.

Operation S703. The network device sends, on a second frequency band, a second transport block to the terminal device, and the terminal device receives, on the second frequency band, the second data packet carrying the second transport block.

The first transport block is the same as the second transport block.

It should be noted that the operation S702 and S703 are not limited on a performing sequence. Performing of operation S703 may be followed by performing of S702. Alternatively, performing of operation S702 may be followed by performing of operation S703. Alternatively, operations S702 and S703 may be simultaneously executed. Before operations S702 and S703, the network device further sends downlink control information corresponding to the first data packet and the second data packet. The downlink control information includes a HARQ process number corresponding to the first data packet and the second data packet. The first frequency band and the second frequency band belong to the first frequency band set. The first transport block and the second transport block correspond to a same first HARQ process number, and the first HARQ process number belongs to the first HARQ process number set. The first data packet and the second data packet carry same transport blocks. That is, the first transport block and the second transport block are the same.

The sending action in the foregoing operations may be implemented by the transceiver 402 of the foregoing network device 201, or may be implemented by the transceiver 402 controlled by the processor 401 of the foregoing network device 201.

The receiving action in the foregoing operations may be implemented by the transceiver 501 of the foregoing terminal device, or may be implemented by the transceiver 501 controlled by the modem processor 504 of the foregoing terminal device.

Operation S704. The terminal device obtains the same transport blocks (that is, the foregoing first transport block and second transport block) by performing joint decoding on the first data packet and the second data packet. The action in the operation may be implemented by the modem processor 504 of the foregoing terminal device.

The terminal device determines, based on that the first HARQ process number belongs to the first HARQ process number set, that data packets that belong to the first frequency band set and that are received on different frequency bands belong to a same HARQ process. That is, transport blocks carried by the data packets are the same. The terminal device further performs joint decoding on a plurality of data packets. More redundant information is included in the plurality of data packets carrying same transport blocks. Therefore, more redundant information can be used by performing joint decoding on the plurality of data packets, to reduce energy of interference noise, so that an error rate of downlink data transmission is reduced, thereby improving reliability of the downlink data transmission.

An embodiment of the present invention further provides an apparatus (such as an integrated circuit, a radio device, or a circuit module) configured to implement the foregoing method. An apparatus described in this specification may be an independent device or may be a part of a relatively large device. The device may be (i) an independent IC; (ii) a set that has one or more ICs and that may include a memory IC configured to store data and/or an instruction; (iii) an RFIC, such as an RF receiver or an RF transmitter/receiver; (iv) an ASIC, such as a mobile station modem; (v) a module that can be embedded into another device; (vi) a receiver, a cellular phone, a radio device, a handheld device, or a mobile unit; (vii) or the like.

The method and apparatus provided in the embodiments of the present invention may be applied to the terminal device or the network device (which may be collectively referred to as a radio device). The terminal device, the network device, or the radio device may include a hardware layer, an operating system layer run on the hardware layer, and an application layer run on the operating system layer. The hardware layer includes hardware such as a central processing unit (CPU), a memory management unit (MMU), or a memory (which is also referred to as a main memory). The operating system may be any one or more computer operating systems, such as a Linux operating system, a Unix operating system, an Android operating system, an iOS operating system, and a Windows operating system, that implement service processing by using a process. The application layer includes an application such as a browser, an address book, word processing software, or instant messaging software. In addition, in the embodiments of the present invention, a specific structure of an execution body of the method is not limited in the embodiments of the present invention, provided that communication can be performed based on a signal transmission method in the embodiments of the present invention by running a program of code recording the method in the embodiments of the present invention. For example, the radio communications method in the embodiments of the present invention may be performed by the terminal device or the network device, or a functional module that is in the terminal device or the network device and that can invoke a program and execute the program.

A person of ordinary skill in the art may be aware that, with reference to the examples described in the embodiments disclosed in this specification, units and algorithm operations can be implemented by electronic hardware or a combination of electronic hardware and computer software. Whether the functions are performed by using hardware or software depends on specific applications and design constraints of the technical solutions. A person skilled in the art may use different methods to implement the described functions for each specific application, but it should not be considered that the implementation goes beyond the scope of the embodiments of the present invention.

In addition, various aspects or features of the embodiments of the present invention may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (such as a hard disk, a floppy disk, or a magnetic tape), an optical disc (such as a compact disc (CD), or a digital versatile disc (DVD)), a smart card, and a flash memory component (such as an erasable programmable read-only memory (EPROM), a card, a stick, or a key drive). In addition, various storage media described in this specification may indicate one or more devices configured to store information and/or other machine-readable media configured to store information. The term "machine-readable media" may include but is not limited to a radio channel and various other media that can store, include, and/or carry an instruction and/or data.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of the present invention are all or partially performed. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (such as a floppy disk, a hard disk, or a magnetic tape), an optical medium (such as a DVD), a semiconductor medium (such as a solid state drive (SSD)), or the like.

It should be understood that sequence numbers of the foregoing processes do not mean execution sequences in various embodiments in the embodiments of the present invention. The execution sequences of the processes should be determined according to functions and internal logic of the processes, and should not be construed as any limitation on the implementation processes of the embodiments of the present invention.

It may be clearly understood by a person skilled in the art that, for the purpose of convenient and brief description, a detailed working process of the foregoing system, apparatus, and unit may refer to a corresponding process in the foregoing method embodiments, and details are not described herein again.

In some embodiments provided in this application, it should be understood that the disclosed system, apparatus, and method may be implemented in another manner. For example, the described apparatus embodiment is merely used as an example. For example, the unit division is merely logical function division and may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, that is, may be located in one position, or may be distributed on a plurality of network units. Some or all of the units may be selected based on actual requirements to achieve an objective of the solutions of the embodiments.

When the functions are implemented in a form of a software functional unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The computer software product is stored in a storage medium, and includes several instructions for enabling a computer device (which may be a personal computer, a server, a network device, or the like) to perform all or some of the operations of the methods described in various embodiments in the embodiments of the present invention. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely specific implementations of the embodiments of the present invention, but are not intended to limit the protection scope of the embodiments of the present invention. Any variation or replacement readily figured out by a person skilled in the art within the technical scope disclosed in the embodiments of the present invention shall all fall within the protection scope of the embodiments of the present invention.

What is claimed is:

1. A communication method, comprising:
   receiving, by a terminal device on a second frequency band, first downlink control information from a network device, wherein the first downlink control information comprises a first hybrid automatic repeat request (HARQ) process number;
   receiving, by the terminal device on a first frequency band, a first data packet carrying a first transport block, and receiving, on the second frequency band, a second data packet carrying a second transport block, wherein the first HARQ process number corresponds to the first transport block on the first frequency band and the second transport block on the second frequency band, and the first transport block is the same as the second transport block, wherein the first frequency band and the second frequency band belong to a first frequency band set, and the first frequency band set comprises at least two frequency bands;
   determining, by the terminal device based on the second frequency band on which the first downlink control information is located, that a HARQ process number corresponding to the second transport block on the first frequency band is the first HARQ process number; and
   performing, by the terminal device, joint decoding on the first data packet and the second data packet.

2. The communication method according to claim 1, wherein
   the first frequency band set is predefined, or
   the first frequency band set is configured by using higher layer signaling.

3. The communication method according to claim 1, wherein before the receiving, by the terminal device on a second frequency band, a second data packet, the method further comprises:
   receiving, by the terminal device, second downlink control information from the network device, wherein the second downlink control information comprises the first HARQ process number, scheduling information of the first data packet, and first indication information, the first indication information indicates that the first HARQ process number is a HARQ process number used by the second frequency band, and
   the first downlink control information further comprises scheduling information of the second data packet.

4. The communication method according to claim 3, wherein
   the first frequency band and the second frequency band belong to a first frequency band set, and the first frequency band set comprises at least two frequency bands; and
   before the receiving, by a terminal device, first downlink control information from a network device, the method further comprises:
   receiving, by the terminal device, indication information of the first frequency band set and/or indication information of the second frequency band by using first signaling, wherein a frequency band other than the second frequency band in the at least two frequency bands is capable of using a HARQ process number corresponding to a transport block on the second frequency band.

5. A communication method, comprising:
   sending, by a network device on a second frequency band, first downlink control information to a terminal device, wherein the first downlink control information comprises a first hybrid automatic repeat request (HARQ) process number; and
   sending, by the network device on a first frequency band, a first data packet carrying a first transport block, and sending, on the second frequency band, a second data packet carrying a second transport block to the terminal device, wherein the first HARQ process number corresponds to the first transport block on the first frequency band and the second transport block on the second frequency band, and the first transport block is the same as the second transport block, wherein the first frequency band and the second frequency band belong to a first frequency band set, and the first frequency band set comprises at least two frequency bands, wherein a HARQ process number corresponding to a transport block on the second frequency band can be used by another frequency band other than the second frequency band in the at least two frequency bands.

6. The communication method according to claim 5, wherein
   the first frequency band set is predefined, or
   the first frequency band set is configured by using higher layer signaling.

7. The communication method according to claim 5, wherein before the sending, by the network device on a second frequency band, a second data packet to the terminal device, the method further comprises:
   sending, by the network device, second downlink control information to the terminal device, wherein the second downlink control information comprises the first HARQ process number, scheduling information of the first data packet, and first indication information, the first indication information indicates that the first HARQ process number is a HARQ process number used by the second frequency band, and
   the first downlink control information further comprises scheduling information of the second data packet.

8. The communication method according to claim 7, wherein before the sending, by a network device, first downlink control information to a terminal device, the method further comprises:
   sending, by the network device, indication information of the first frequency band set and indication information of the second frequency band by using first signaling, wherein a frequency band other than the second frequency band in the at least two frequency bands is capable of using a HARQ process number corresponding to a transport block on the second frequency band.

9. A wireless apparatus, comprising:
   a processor, a memory coupled to the processor, and a transceiver, wherein
   the transceiver is configured to receive, on a second frequency band, first downlink control information, wherein the first downlink control information comprises a first hybrid automatic repeat request (HARQ) process number;
   the transceiver is further configured to: receive, on a first frequency band, a first data packet carrying a first transport block, and receive, on the second frequency band, a second data packet carrying a second transport block, wherein the first HARQ process number corresponds to the first transport block on the first frequency band and the second transport block on the second frequency band, wherein the first frequency band and the second frequency band belong to a first frequency band set, and the first frequency band set comprises at least two frequency bands; and the processor is configured to determine, based on the second frequency band on which the first downlink control information is located, that a HARQ process number corresponding to the second transport block on the first frequency band is the first HARQ process number, and perform joint decoding on the first data packet and the second data packet.

10. The wireless apparatus according to claim 9, wherein the first frequency band set is predefined, or the first frequency band set is configured by using higher layer signaling.

11. The wireless apparatus according to claim 9, wherein before the transceiver is configured to receive a second data packet on a second frequency band, the transceiver is further configured to:

receive second downlink control information, wherein the second downlink control information comprises the first HARQ process number, scheduling information of the first data packet, and first indication information, the first indication information indicates that the first HARQ process number is a HARQ process number used by the second frequency band, and the first downlink control information further comprises scheduling information of the second data packet.

12. The wireless apparatus according to claim 11, wherein the first frequency band and the second frequency band belong to a first frequency band set, and the first frequency band set comprises at least two frequency bands; and before the transceiver is configured to receive first downlink control information, the transceiver is further configured to:

receive indication information of the first frequency band set and/or indication information of the second frequency band by using first signaling, wherein a frequency band other than the second frequency band in the at least two frequency bands uses a HARQ process number corresponding to a transport block on the second frequency band.

13. A network device, comprising:

a processor, a memory coupled to the processor, and a transceiver, wherein the transceiver is configured to send, on a second frequency band, first downlink control information, wherein the first downlink control information comprises a first hybrid automatic repeat request (HARQ) process number;

the transceiver is further configured to: send, on a first frequency band, a first data packet carrying a first transport block, and send, on the second frequency band, a second data packet carrying a second transport block, wherein the first HARQ process number corresponds to the first transport block on the first frequency band and the second transport block on the second frequency band, and the first transport block is the same as the second transport block, wherein the first frequency band and the second frequency band belong to a first frequency band set, and the first frequency band set comprises at least two frequency bands, wherein a HARQ process number corresponding to a transport block on the second frequency band can be used by another frequency band other than the second frequency band in the at least two frequency bands.

14. The network device according to claim 13, wherein the first frequency band set is predefined, or the first frequency band set is configured by using higher layer signaling.

15. The network device according to claim 13, wherein before the transceiver is configured to send a second data packet on a second frequency band, the transceiver is further configured to:

the transceiver is further configured to send second downlink control information, wherein the second downlink control information comprises the first HARQ process number, scheduling information of the first data packet, and first indication information, the first indication information indicates that the first HARQ process number is a HARQ process number used by the second frequency band, and the first downlink control information further comprises scheduling information of the second data packet.

16. The network device according to claim 15, wherein before the transceiver is configured to send first downlink control information, the transceiver is configured to send indication information of the first frequency band set and indication information of the second frequency band by using first signaling, wherein a frequency band other than the second frequency band in the at least two frequency bands is capable of using a HARQ process number corresponding to a transport block on the second frequency band.

* * * * *